MULTI-CIRCUIT COMMUNICATION PLUG AND SWITCH THEREFOR

Filed Aug. 7, 1964 3 Sheets-Sheet 1

INVENTOR.
WILLIAM H. FLANAGAN
BY James B. Tiffany Jr.
ATTORNEY

MULTI-CIRCUIT COMMUNICATION PLUG AND SWITCH THEREFOR

Filed Aug. 7, 1964 3 Sheets-Sheet 2

INVENTOR.
WILLIAM H. FLANAGAN
BY James B. Tizzano
ATTORNEY

July 26, 1966 W. H. FLANAGAN 3,263,036

MULTI-CIRCUIT COMMUNICATION PLUG AND SWITCH THEREFOR

Filed Aug. 7, 1964 3 Sheets-Sheet 3

INVENTOR.
WILLIAM H. FLANAGAN
BY James B. Tizzano Jr.
ATTORNEY

United States Patent Office 3,263,036
Patented July 26, 1966

3,263,036
MULTI-CIRCUIT COMMUNICATION PLUG AND SWITCH THEREFOR

William H. Flanagan, 395 Chestnut Hill Road, Stamford, Conn.

Filed Aug. 7, 1964, Ser. No. 388,142
2 Claims. (Cl. 200—51)

This invention relates generally to electrical devices and in particular to a communication plug, switch and jack which will permit the selection of alternate microphones or the like in a circuit.

With the advent of complicated communication circuitry particularly in the aviation industry a need has developed for simple but effective switching apparatus to permit the operator to avail himself of alternate microphones positioned at various locations within the aircraft. With reference particularly to military aircraft where the aircraft interior is under pressure, a boom microphone is utilized for interior and ground communications; however, during certain operational procedures or due to a failure of the pressurized system, oxygen masks are used having a microphone integral therewith. Due to the electrical requirements of the system, it is impractical to have both the boom and oxygen microphone energized at the same time and consequently an efficient and simple switching mechanism is required to connect either the boom microphone or oxygen microphone to the input circuitry. Since space is an important factor in aircraft equipment, it is desirable to provide a switch which is proximate to the jack and plug, easily accessible to the operator and of small and convenient size. Existing devices now in use to provide the same or a similar function are bulky and requires separate maintenance and additional procedural checkouts.

Therefore, it is an object of this invention to provide a unique, novel and useful electrical plug and switch jack whereby problems now present in the industry are effectively and simply solved.

It is another object of this invention to provide an electrical plug and jack having switching mechanisms integral therewith.

It is a further object of this invention to provide a phone plug and switch which is adapted for use with existing communication equipment.

It is a further object of this invention to provide a miniaturized combination plug and switch adapted for insertion and removable from jacks located in aircraft enabling continuity between communication systems and alternate microphones.

Other objects of this invention will in part be obvious, and will, in part, appear hereinafter.

Broadly stated one feature of this invention is to provide a communication phone plug-switch and jack having internal wiring connected to the headphones through the plug and alternate contacts energized through a double pole double throw slide switch to connect either a boom or oxygen microphone to the circuitry.

By providing a combination plug having an integral switch and phone jack all wiring may be self contained and as the phone plug is attached to the head set by a short length of cable the switching mechanism is readily accessible and convenient to the operator.

To the accomplishment of this and the foregoing related ends, the present invention then consists of the means hereinafter fully described and particularly pointed out in the claims, the annexed drawings and the following description setting forth in detail certain means in the carrying out of the invention, such disclosed means illustrating, however, but one of the various ways in which the principle of the invention may be employed.

Figure 2:
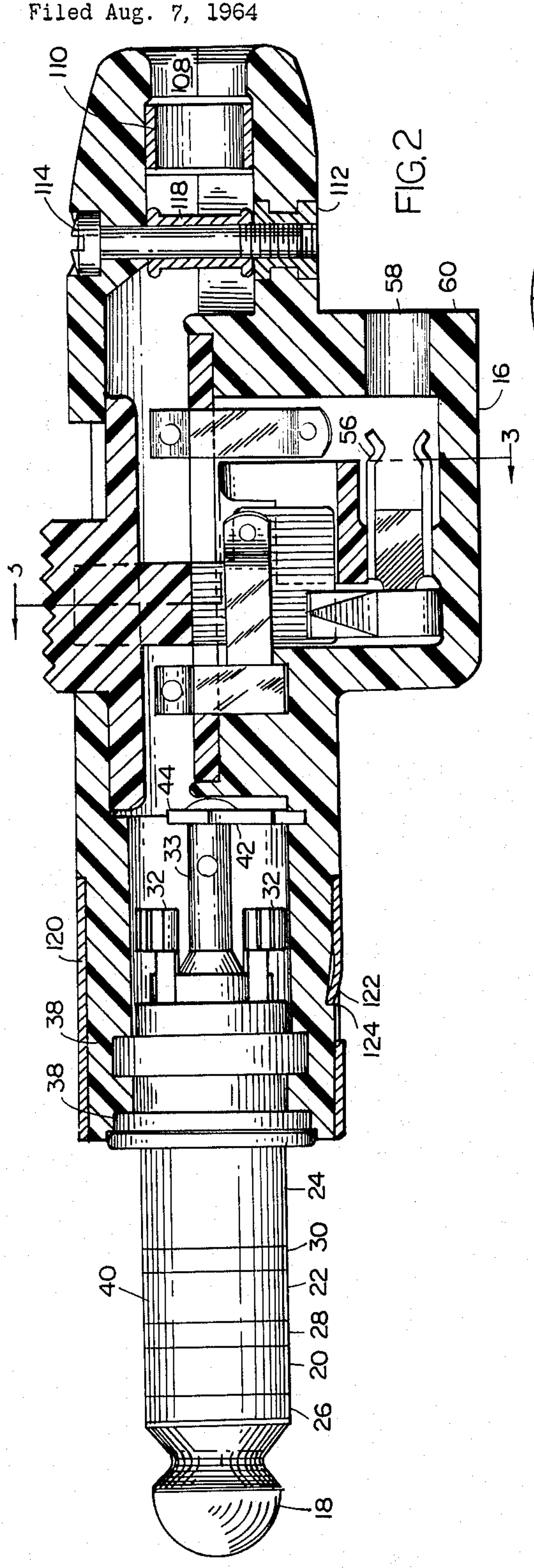
FIG. 2 is a view in elevation partly in section of the plug, switch and jack.
Figure 3:
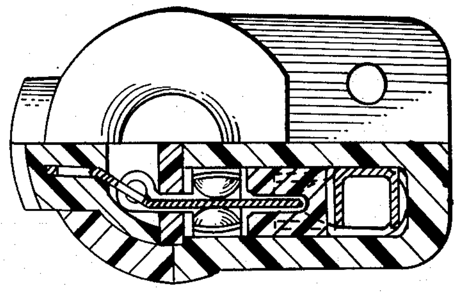
FIG. 3 is a view taken on line 3—3 of FIG. 2.
Figure 1:
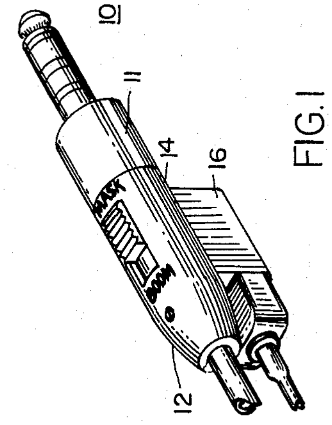
FIG. 1 is a view in perspective of the plug, switch and jack.

Reference is now to be had to the drawings wherein a preferred embodiment of the plug, switch and jack, a construction made in accordance with the present invention and designated by the reference numeral 10 is shown. The plug 10 is constructed to provide a molded housing 11 having an upper 12 and a lower half 14 formed of any suitable di-electric material such as a thermoset or thermo plastic. The housing is generally of tubular shape having an extension 16 formed integral with the lower half for a purpose to be more fully described hereinafter.

Figure 4:
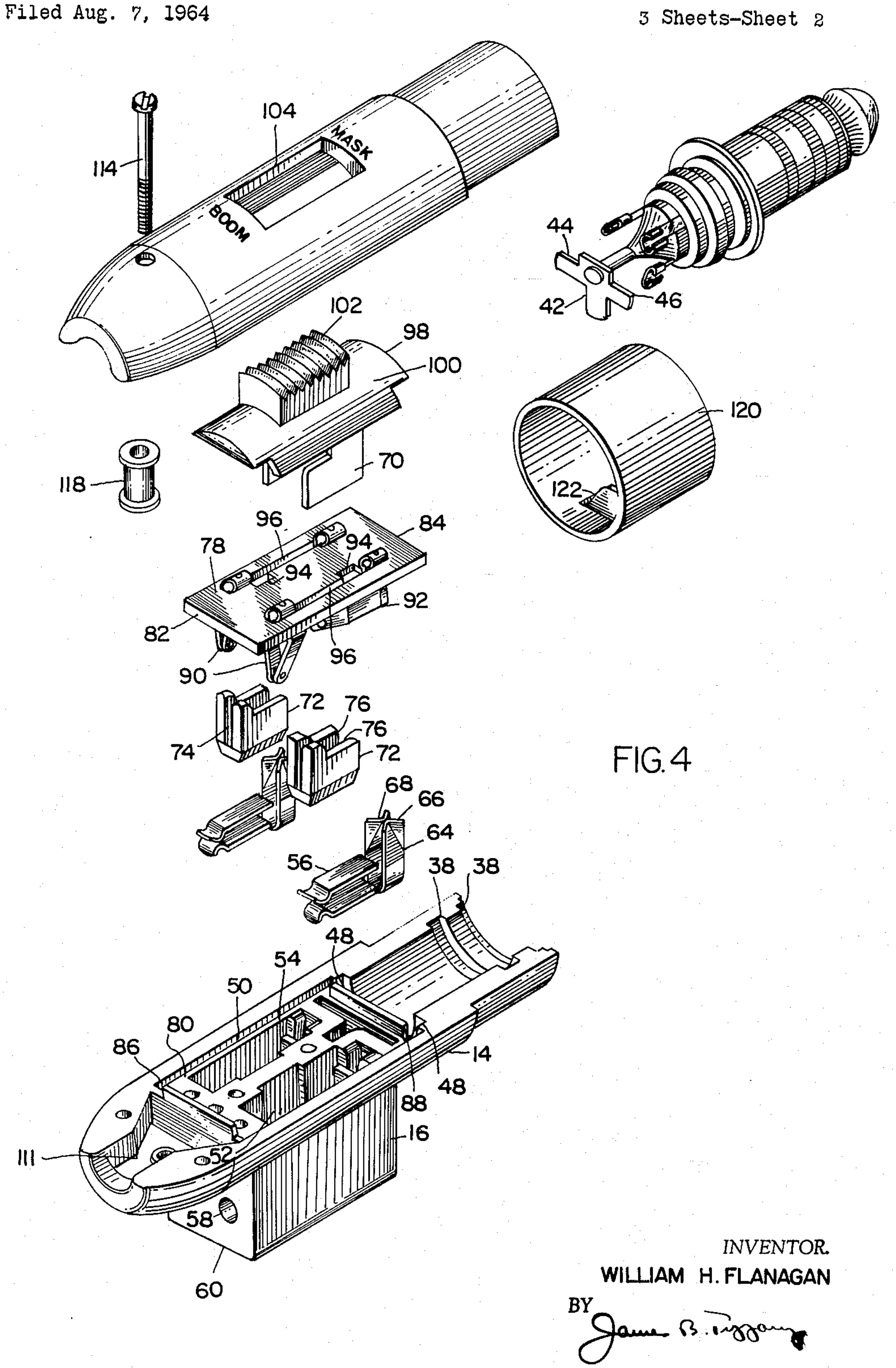
FIG. 4 is an exploded view of the components of the phone plug.
Figure 5:
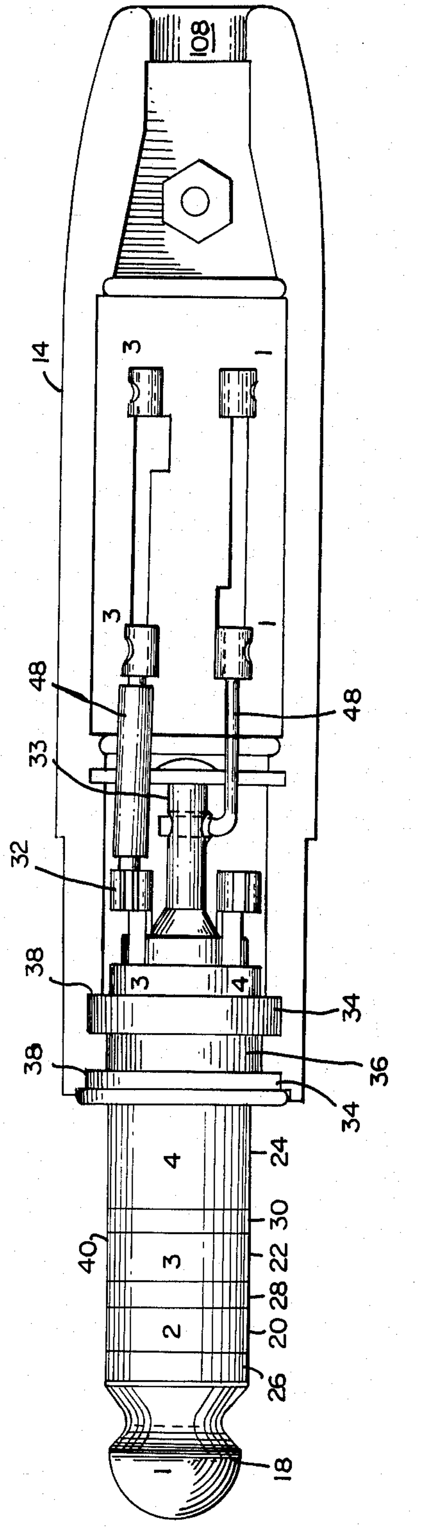
FIG. 5 is a top plan view of the phone plug with the upper housing removed.

As illustrated in FIGS. 2, 4 and 5, plug 10 has a series of electrical male contacts 18, 20, 22 and 24 laterally spaced from each other by insulators 26, 28 and 30. Electrical connections to the contacts 18–24 of the internal wiring of the assembly are effected by means of the terminals 32 and the central terminals 33, which extend from the contacts and are disposed within the lower housing 14. A series of molded circular bosses, 34 are formed on the base 36 which fit within the recesses 38 within one end of the lower housing 14 to prevent longitudinal movement of the contact assembly 40 within the housing 11. The central terminal 33 has a plate 42 staked at one end thereof having flange portions 44 and 46 which lie within recesses 48 in the lower housing 14 in such a manner that portions of the upper housing 14 are positioned over these recesses and prevent the contact assembly from rotating within the housing 11 and putting stresses on the internal wiring 48.

Referring to FIG. 4 which is an exploded view of the plug, switch and jack there is illustrated the interior configuration of the lower housing 14, having cut out portions 50 and 52 separated by a divider 54. The recesses each are adapted to receive and retain the longitudinally extending vertically spaced female contact members 56 which ultimately are positioned in axial alignment with the apertures 58 formed in the wall 60 of the extension 16. The upper portion 64 of the contact members 56 have laterally spaced triangular shaped members 66 extending substantially normal to the longitudinal portions 56 with their apexes 68 separated from each other a distance less than the thickness of the male switch contacts 70 for a purpose to be set forth more fully hereinafter.

Insulators 72 are superposed above the contacts 56 and serve to position and hold them in place and are bifurcated by slot 74 so that the opposing walls 76 act as guides for the lonigtudinal movement of the switch contacts 70 and prevent lateral movement thereof.

A terminal board 78 constructed of an insulating material is positioned on the recessed upper edges 80 of the lower housing 14 and the front 82 and rear edges 84 are in abutting relationship with upwardly extending flanges 86 and 88 which are molded integral with the housing 11. Pairs of contact members 90 and 92 are positioned in the terminal board 78 by means of cutout slots 94 which extend inwardly from two elongated slots 96 laterally spaced from each other. The switch member 98 comprises a semi-cylindrical slider 100 formed of insulating material having a serrated rectangular projection 102 adapted to extend through the opening 104 in the upper housing 12 for a longitudinal sliding engagement therein. A pair of contact members 70 extend downwardly substantially normal to the slider 100 and have an L-shaped configuration.

The contact members 70 extend through the slots 96 in the terminal board 78 so as to permit mechanical and electrical engagement with the contacts 90 when the switch is in the rearward position and the upper portion 64 of the contact members 56 when the switch is in the forward position. The contact members 70 are always in contact with contact members 92 which are the common connector.

As illustrated in FIG. 5, internal wiring 48 connects the #1 plug contact 33 to the #1 common switch terminal of the switch and the #3 plug contact 33 to the #3 common switch terminal. Other wiring (not shown) extends from the #2 and #4 terminals of the plug passing between the blade members 70 of the slide 98 and to the earphones of the head set by means of the opening 108. A cable (not shown) connecting the headset to the plug is maintained in position within the plug by a clamp 110 positioned within a recess 111 so as to prevent twisting of the cable within the switch housing and damage to the internal wiring.

The upper 12 and lower 14 housings are secured by means of a nut 112 positioned near the rear and within the lower housing and a kerfed bolt 114 positioned within a recess 116 an the upper housing 12. The bolt 114 passes through a hollow spool 118 which serves to strengthen and guide the bolt into the nut 112 and further acts as a strain relief anchor for stay cords (not shown) which are integral with the wiring and prevent strains on the contact members and the disruption of electrical continuity.

The front ends of both the upper 12 and lower housing 14 are held together by a sleeve member 120 having an inwardly formed detent 122 adapted for snap engagement with a forwardly facing notch 124 formed on the under surface 126 of the lower housing 14.

In the operation of the device, a secondary plug (not shown) is plugged into the contacts 56 with the plug having wiring to a microphone contained within the oxygen mask. Contacts, 18 and 22 of the contact assembly 40 are connected by internal wiring to the contacts 92 which are in constant engagement with blades 70 of slide 98. Contacts 90 are connected by the cable passing through 108 to the boom microphone (not shown). As a result when the operator wishes to energize the boom microphone the switch is manually moved to the rearward position and when the contacts 70 engage contacts 90 and when it becomes necessary or desirable to utilize the microphone contained within the oxygen mask the switch is shifted to its forward position where the contacts 70 engage contacts 56.

While there have been described herein what are at present considered preferred embodiments of the invention, it will be obvious to those skilled in the art that modification and changes may be made therein without departing from the essence of the invention. It is therefore to be understood that the exemplary embodiments are illustrative and are not restrictive of the invention the scope of which is defined in the appended claims, and that all modifications that come within the meaning and range of equivalency of the claims are intended to be included therein.

I claim:

1. A multi-circuit communications phone plug, having in combination a slide switch, a plurality of male contact members extending from one end thereof, and a female jack receptacle at the other end, said plug containing a centrally disposed slotted terminal board having 1st and 2nd pairs of fixed contacts mounted adjacent each of the distal ends thereof, said phone plug maintained in electrical continuity with said 1st pairs of fixed contacts, said slide switch having downwardly depending L-shaped contact members extending through said slotted terminal board and adapted for linear movement therein, a 3rd set of fixed contact members extending from said female jack receptacle and positioned at one end of the travel of said slide switch and adjacent the said 1st pairs of fixed contacts whereby longitudinal movement of the slide switch will select the female jack receptacle or the 2nd set of fixed contacts.

2. A multi-circuit communications phone plug having in combination a slide switch, a plurality of male contact members extending from one end thereof, and a female jack receptacle at the other end thereof, a slotted terminal board centrally located within said plug having 1st and 2nd pairs of stationary contacts at each end thereof, said 1st pair being common to the male contact members, said slide switch having L-shaped contact means depending downwardly therefrom extending through said slotted terminal board, and longitudinally moveable therein, female receptacle contact members extending angularly upward so as to lie adjacent to but spaced from said 1st pair of stationary contact members; whereby positioning of the switch selectively utilizes the female jack receptacle or the 2nd pair of stationary contact members.

References Cited by the Examiner

UNITED STATES PATENTS

| | | | |
|---|---|---|---|
| 1,568,297 | 1/1926 | Smalenberger | 200—51 X |
| 1,593,616 | 7/1926 | Zisch | 200—51 |
| 3,174,002 | 3/1965 | Golbeck | 200—16 |

ROBERT K. SCHAEFER, *Primary Examiner.*

KATHLEEN H. CLAFFY, *Examiner.*

D. SMITH, Jr., *Assistant Examiner.*